(12) United States Patent
Moy

(10) Patent No.: US 9,423,282 B2
(45) Date of Patent: Aug. 23, 2016

(54) METROLOGY DEVICE AND A METHOD FOR COMPENSATING FOR BEARING RUNOUT ERROR

(71) Applicant: FARO Technologies, Inc., Lake Mary, FL (US)

(72) Inventor: Eric J. Moy, Orlando, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/729,151

(22) Filed: Jun. 3, 2015

(65) Prior Publication Data

US 2015/0362348 A1 Dec. 17, 2015

Related U.S. Application Data

(60) Provisional application No. 62/011,288, filed on Jun. 12, 2014.

(51) Int. Cl.
  *G01B 5/00* (2006.01)
  *G01D 18/00* (2006.01)
  (Continued)

(52) U.S. Cl.
  CPC ........... *G01D 18/008* (2013.01); *F16C 41/007* (2013.01); *G01D 5/24452* (2013.01); *G01D 5/3473* (2013.01)

(58) Field of Classification Search
  CPC  G01B 2210/58; G01B 5/008; G01B 21/047; G01B 5/012; G01B 11/005; G01B 7/012; G01B 11/002; G01B 11/007
  USPC .......................................................... 33/503
  See application file for complete search history.

(56) References Cited

U.S. PATENT DOCUMENTS

| 4,676,002 A | 6/1987 | Slocum |
| 6,138,367 A | 10/2000 | Raby |

(Continued)

FOREIGN PATENT DOCUMENTS

| EP | 1750085 | 2/2007 |
| JP | S64414 A | 1/1989 |

(Continued)

OTHER PUBLICATIONS

Geckeler, D. Ralf; Calibration of Angle Encoders Using Transfer Functions; Measurement Science and Technology; vol. 17 (2006) 2811-2818 pages.

(Continued)

*Primary Examiner* — Yaritza Guadalupe-McCall
(74) *Attorney, Agent, or Firm* — Cantor Colburn LLP

(57) ABSTRACT

A system and method for determining the angular position of a bearing assembly and compensating measurements for bearing runout error in metrology devices, such as an articulated arm coordinate measurement device and a laser tracker, is provided. The system and method includes measuring the bearing runout error and defining a waveform from encoder readings for a first set of rotations. In one embodiment, a transfer function is created based on an analysis of the bearing runout error, such as with a Fourier analysis for example. In another embodiment the bearing runout error is mapped to an absolute angular position. During operation, the angular position of the bearing assembly is determined by comparing a waveform to the waveform from the first set of rotations. With the angular position determined, the bearing runout error may be used to compensate the measurements of the metrology device.

19 Claims, 11 Drawing Sheets

(51) Int. Cl.
*F16C 41/00* (2006.01)
*G01D 5/244* (2006.01)
*G01D 5/347* (2006.01)

(56) References Cited

U.S. PATENT DOCUMENTS

| | | | |
|---|---|---|---|
| 6,243,658 B1 | 6/2001 | Raby | |
| 6,957,496 B2 | 10/2005 | Raab et al. | |
| 6,973,734 B2 | 12/2005 | Raab et al. | |
| 7,073,271 B2 | 7/2006 | Raab et al. | |
| 7,296,363 B2 * | 11/2007 | Danisch | G01P 15/18 33/503 |
| 7,327,446 B2 | 2/2008 | Cramer et al. | |
| 7,395,606 B2 | 7/2008 | Crampton | |
| 7,591,078 B2 | 9/2009 | Crampton | |
| 7,701,559 B2 | 4/2010 | Bridges et al. | |
| 7,800,758 B1 | 9/2010 | Bridges et al. | |
| RE42,082 E | 2/2011 | Raab et al. | |
| 7,954,250 B2 | 6/2011 | Crampton | |
| 8,763,267 B2 * | 7/2014 | Duportal | G01B 5/008 33/503 |
| 9,046,362 B2 | 6/2015 | Westermark et al. | |
| 2005/0212513 A1 | 9/2005 | Yamashita et al. | |
| 2005/0225769 A1 | 10/2005 | Bankhead et al. | |
| 2009/0000136 A1 | 1/2009 | Crampton | |
| 2009/0187373 A1 * | 7/2009 | Atwell | B25J 9/1692 33/503 |
| 2010/0128259 A1 | 5/2010 | Bridges et al. | |
| 2011/0282612 A1 | 11/2011 | Cramer | |
| 2012/0206716 A1 | 8/2012 | Cramer et al. | |
| 2012/0222465 A1 | 9/2012 | Lippuner et al. | |
| 2012/0326709 A1 | 12/2012 | Westermark et al. | |
| 2013/0097882 A1 * | 4/2013 | Bridges | G01B 11/005 33/503 |
| 2013/0125408 A1 * | 5/2013 | Atwell | G01B 11/005 33/503 |
| 2013/0308117 A1 | 11/2013 | Bridges | |
| 2014/0202016 A1 * | 7/2014 | Bridges | G01B 21/047 33/503 |
| 2014/0260627 A1 * | 9/2014 | Ferrari | G01N 29/265 73/618 |
| 2015/0075018 A1 * | 3/2015 | Bridges | G01B 5/008 33/503 |
| 2015/0219452 A1 * | 8/2015 | Bridges | G01B 21/042 33/503 |
| 2015/0260506 A1 | 9/2015 | Bridges | |
| 2015/0330761 A1 * | 11/2015 | Gong | G01B 7/012 33/503 |
| 2015/0330762 A1 * | 11/2015 | Gong | G01B 5/008 33/503 |
| 2015/0330763 A1 * | 11/2015 | Gong | G01B 5/008 33/503 |
| 2015/0330764 A1 * | 11/2015 | Gong | G01B 7/012 33/503 |
| 2015/0330765 A1 * | 11/2015 | Gong | G01B 7/012 33/503 |
| 2015/0330766 A1 * | 11/2015 | Gong | G06F 9/445 33/503 |
| 2015/0362305 A1 * | 12/2015 | Ferrari | G01B 5/012 33/503 |

FOREIGN PATENT DOCUMENTS

| | | |
|---|---|---|
| JP | H1038615 A | 2/1998 |
| JP | 2007504459 A | 9/2003 |
| JP | 200629937 A | 2/2006 |
| JP | 2007521480 A | 8/2007 |
| JP | 2008527356 A | 7/2008 |
| JP | 201096708 A | 8/2008 |
| JP | 2009156773 A | 7/2009 |
| JP | 2009526209 A | 7/2009 |
| JP | 2012509464 A | 4/2012 |
| WO | 2005026772 A2 | 3/2005 |
| WO | 2010057169 A2 | 5/2010 |
| WO | 2012061122 | 5/2012 |
| WO | 2013092319 A1 | 6/2013 |

OTHER PUBLICATIONS

Notification of Transmittal of the International Search Report for International Aplication No. PCT/US2015/034142 dated Aug. 4, 2015; Mailed Aug. 13, 2015; 6 pages.

Written Opinion of the International Searching Authority for International Application No. PCT/US2015/034142 dated Aug. 4, 2015; Mailed Aug. 13, 2015; 8 pages.

E.R. Marsh "Precision Spindle Metrology" (109 pages) ASPE Annuyal Meeting.

Marsh et al "Precision Spindle Metrology: Test Instrumentation" Chapter 3-5 cover and front page (pp. 39-128) Jan. 1, 2010, Destech Publications, US; ISN: 978-1-61344-582-2; retrieved from the Internet URL:http://www.knovel.com/web/portal/browse/disp.

Miller, Scott W., et al; Angular Runout Test Setup for High-Precision Ball Bearings; Proceedings of the 41st Aerospace Mechanisms Symposium, Jet Propulsion Laboratory; May 16-18, 2012; pp. 439-450.

Muralikrishnan, et al., "ASME B89.4.19 Performance Evaluation Tests and Geometric Misalignments in Laser Trackers," J. Res. Natl. Inst. Stand. Technol. 114, 21-35 (2009).

* cited by examiner

METROLOGY DEVICE AND A METHOD FOR COMPENSATING FOR BEARING RUNOUT ERROR

CROSS-REFERENCE TO RELATED APPLICATIONS

The present Application is a Nonprovisional Application that claims the benefit of U.S. Provisional Application Ser. No. 62/011,288 filed on Jun. 12, 2014 entitled Metrology Device and a Method for Compensating for Bearing Runout Error, the contents of which are incorporated by reference herein in its entirety.

BACKGROUND OF THE INVENTION

The subject matter disclosed herein relates to a metrology device, such as a portable articulated arm coordinate measurement machine (AACMM) or laser tracker, and to a metrology device that can compensate for synchronous and asynchronous bearing runout error.

A metrology device is a device that may be used by an operator to measure and electronically capture coordinates of points on a surface. There are several different types of metrology devices, such as but not limited to: an AACMM, a laser line probe, a laser tracker and an optical structured light scanner for example. The coordinates of the measured points are determined relative to a local coordinate reference system of the measurement device. For example, the AACMM may have a local coordinate system positioned in the base of the device. The local coordinate reference system allows each of the measurements made by the measurement device to be taken relative to each other. The coordinate reference system may be made during post processing.

Typically, the metrology device, such as an AACMM for example, will have a number of rotational joints. The rotation of these joints is monitored using a sensor such as a rotary encoder. One source of error in the measurement of the coordinates of the measured points is due to bearing runout error at each rotary joint. Bearing runout error has two components: 1) a synchronous error that repeats each rotation; and 2) an asynchronous error that changes with each rotation. It should be appreciated that while the synchronous error may be compensated in the calculation of the coordinates, asynchronous error is more difficult as the coordinate measurement device needs to track the number of rotations of the bearing assembly. The tracking of the bearing rotation is difficult since the rotary joint may be moved when the coordinate measurement device is in an unpowered state.

Accordingly, while existing metrology devices are suitable for their intended purposes the need for improvement remains, particularly in providing a metrology device that compensates for synchronous and asynchronous errors in rotary joints.

BRIEF DESCRIPTION OF THE INVENTION

According to one aspect of the invention, a method of determining an angular rotation position of a metrology device is provided. The method comprising: providing an encoder coupled to at least one bearing, the encoder having at least a first read head and a second read head, the encoder configured to measure in operation the angular rotation of the at least one bearing; rotating the at least one bearing for a predetermined number of rotations; generating a first signal with the first read head and a second signal with the second read head in response to the rotation of the at least one bearing; defining a first waveform by subtracting the first signal from the second signal; perform a Fourier analysis on the first waveform to define a series of sinusoidal waves for the predetermined number of rotations; generate a transfer function based on the series of sinusoidal waves as a function of absolute angular position; and store, in a memory operably coupled to the metrology device, the first waveform and the transfer function.

According to another aspect of the invention, a method of determining an angular rotation position of a metrology device. The method comprising: providing the metrology device having a manually positionable articulated arm portion having opposed first end and second end, the arm portion including a plurality of connected arm segments, wherein the plurality of connected arm segments includes a first arm segment and a second arm segment, the metrology device further having a processor circuit having a memory; providing an encoder coupled to at least one bearing, the encoder and the at least one bearing configured to couple between the first arm segment and the second arm segment, the encoder having at least a first read head and a second read head, the encoder configured to measure in operation an angular rotation of the at least one bearing, wherein the encoder is configured to transmit a signal to the processor circuit; rotating the at least one bearing for a predetermined number of rotations; generating a first signal with the first read head and a second signal with the second read head in response to the rotation of the at least one bearing; defining a first waveform by subtracting the first signal from the second signal; perform a Fourier analysis on the first waveform to define a series of sinusoidal waves for the predetermined number of rotations; generate a transfer function based on the series of sinusoidal waves as a function of absolute angular position; and storing, in the memory, the first waveform and the transfer function.

According to yet another aspect of the invention, A method of determining an angular rotation position of a metrology device. The method comprising: providing a laser tracker having a structure configured to rotate about a first axis and a second axis, a first light source that launches a first light beam from the structure, a distance meter, and a processor circuit having memory; providing an encoder coupled to at least one bearing, the encoder and the at least one bearing configured to couple to the laser tracker and rotate the structure about the first axis, the encoder having at least a first read head and a second read head, the encoder configured to measure in operation an angular rotation of the at least one bearing, wherein the encoder is configured to transmit a signal to the processor circuit; rotating the at least one bearing for a predetermined number of rotations; generating a first signal with the first read head and a second signal with the second read head in response to the rotation of the at least one bearing; defining a first waveform by subtracting the first signal from the second signal; perform a Fourier analysis on the first waveform to define a series of sinusoidal waves for the predetermined number of rotations; generate a transfer function based on the series of sinusoidal waves as a function of absolute angular position; and storing, in the memory, the first waveform and the transfer function.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide advantages in allowing the compensation of synchronous and asynchronous bearing run out error. Embodiments provide further advantages in determining the angular position of the rotary joint when the joint has been rotated with the metrology device in an unpowered state.

Figure 1:
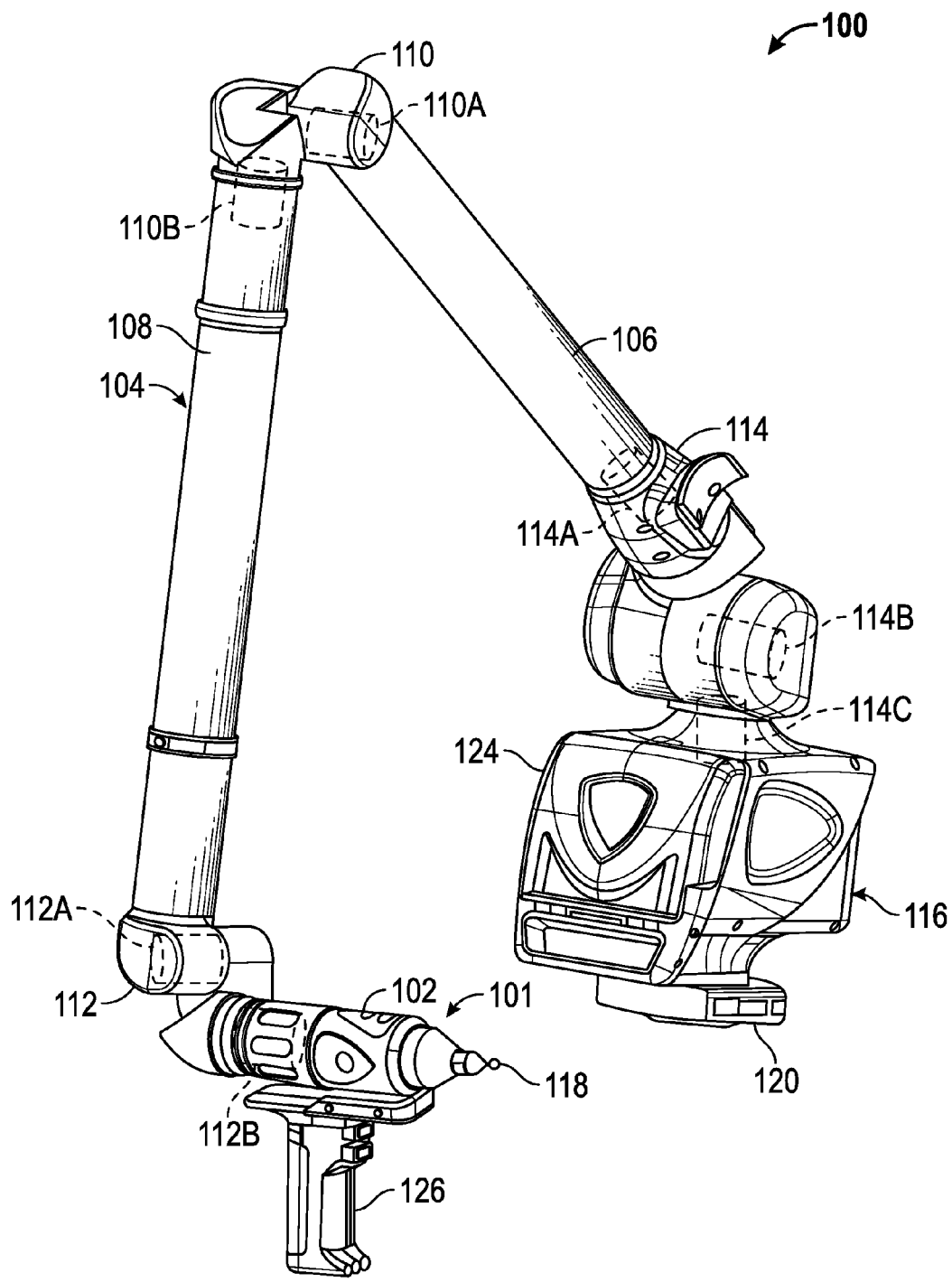
FIG. 1 is a perspective views of a portable articulated arm coordinate measuring machine (AACMM) in accordance with an embodiment of the present invention.

Referring now to FIG. 1, an AACMM 100 is illustrated according to various embodiments of the present invention, an articulated arm being one type of coordinate measuring device. The exemplary AACMM 100 may comprise a six or seven axis articulated measurement device having a probe end 101 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges 110A, 110B). A second grouping of bearing cartridges 112 (e.g., two bearing cartridges 112A, 112B) couples the second arm segment 108 to the measurement probe housing 102. A third grouping of bearing cartridges 114 (e.g., three bearing cartridges 114A, 114B, 114C) couples the first arm segment 106 to a base 116 located at the other end of the arm portion 104 of the AACMM 100. Each grouping of bearing cartridges 110, 112, 114 provides for multiple axes of articulated movement. Also, the probe end 101 may include a measurement probe housing 102 that comprises the shaft of an axis of rotation for the AACMM 100 (e.g., a cartridge 112B containing an encoder system that determines movement of the measurement device, for example a probe 118, in an axis of rotation for the AACMM 100). In this embodiment, the probe end 101 may rotate about an axis extending through the center of measurement probe housing 102. In use of the AACMM 100, the base 116 is typically affixed to a work surface by an attachment device 120.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device configured to provide non-contact distance measurement of an object, thereby providing advantages in allowing the operator to make both contact and non-contact measurements with the same AACMM 100. In exemplary embodiments, the probe 118 is a contacting measurement device and is removable. The probe 118 may have different tips 118 that physically contact the object to be measured, including, but not limited to: ball, touch-sensitive, curved and extension type probes. In an embodiment, the handle 126 is replaced with the coded structured light scanner device. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

In one embodiment, the AACMM 100 includes the removable handle 126, such as that described in commonly owned U.S. Pat. No. 8,533,967 which is incorporated herein by reference. The removable handle 126 may provide advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end 101.

In various embodiments, each grouping of bearing cartridges 110, 112, 114 allow the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data.

The base 116 may include an attachment device or mounting device 120. The mounting device 120 allows the AACMM 100 to be removably mounted to a desired location, such as an inspection table, a machining center, a wall or the floor for example. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system 134 that includes two primary components: a base processing system 130 (FIG. 2) that processes the data from the various encoder systems within the AACMM 100 as well as data representing other arm parameters to support three-dimensional (3-D) positional calculations; and an optional user interface processing system 132 that that may include an on-board operating system, a touch screen display, and resident application software that allows for relatively complete metrology functions to be implemented within the AACMM 100 without the need for connection to an external computer. In the exemplary embodiment, the base processing system 134 couples with a remote computer (not shown), such as by a wire or wireless communications medium for example, and the remote computer provides the user interface functionality. The remote computer may include, but is not limited to: a desktop computer, a laptop computer, a tablet computer or a cellular phone for example.

The electronic data processing system 134 in the base 116 may communicate with the encoder systems, sensors, and other peripheral hardware located away from the base 116 (e.g., a noncontact distance measurement device that can be mounted to the removable handle 126 on the AACMM 100). The electronics that support these peripheral hardware devices or features may be located in each of the bearing cartridge groupings 110, 112, 114 located within the portable AACMM 100.

Figure 2:
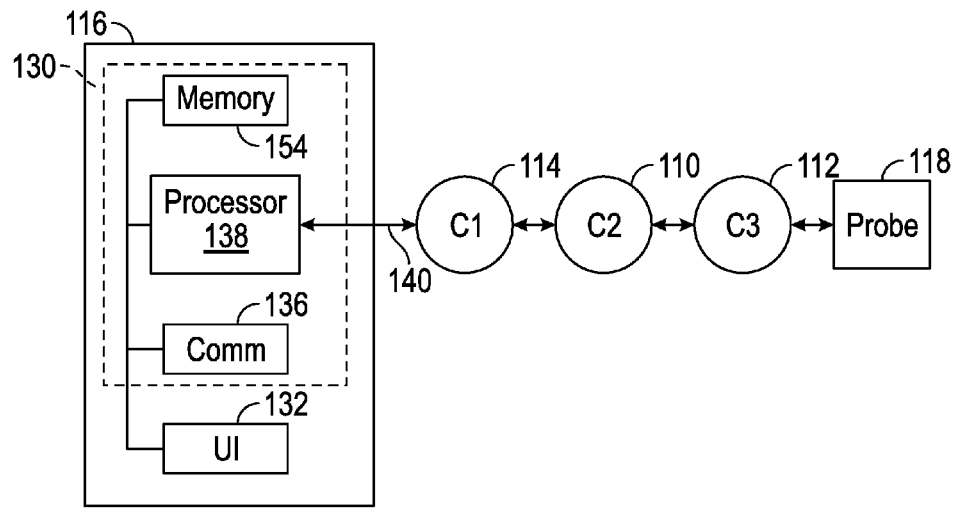
FIG. 2 is a block diagram of an electronic data processing system utilized as part of the AACMM of FIG. 1 in accordance with an embodiment.

FIG. 2 is a block diagram of the electronic circuit utilized in an AACMM 100 in accordance with an embodiment. In an embodiment the electronic data processing system 134 includes a base processor 138 for implementing the base processing system 130, an optional user interface board 132, a base power board (not shown) for providing power and a communications module 136. The optional user interface board 132 may include a computer processor for executing application software to perform user interface, display, and other functions described herein.

Figure 3:
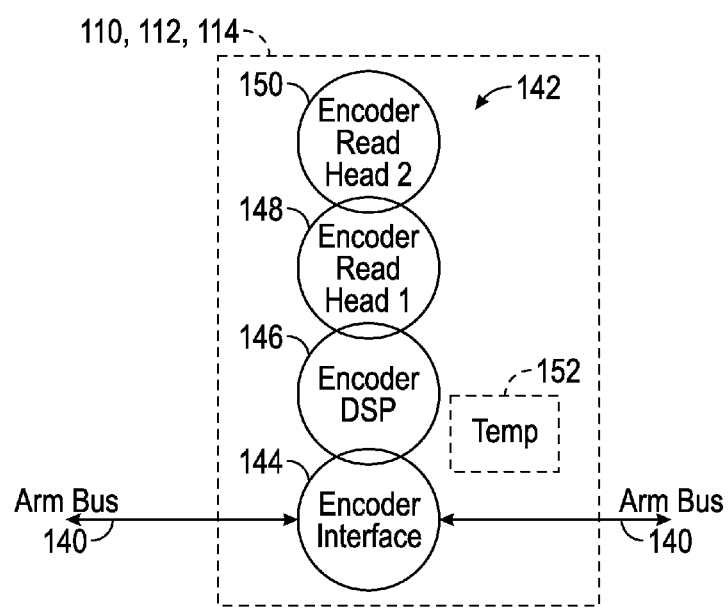
FIG. 3 is a block diagram describing features of a bearing encoder cartridge of the electronic data processing system of FIG. 2 in accordance with an embodiment.

The electronic data processing system 134 is in communication with the aforementioned plurality of encoder systems via one or more arm buses 140. In the embodiment depicted in FIG. 3, each encoder system 142 generates encoder data and includes: an encoder arm bus interface 144, an encoder digital signal processor (DSP) 146, a first encoder read head 148, a second encoder read head 150, and a temperature sensor 152. Other devices, such as strain sensors, may be attached to the arm bus 140.

It should be appreciated that the probe end 101 is also in communication with the arm bus 140. The probe end electronics may include a probe end DSP, a temperature sensor, a handle/device interface bus that connects with the handle 126 or the noncontact distance measurement device via an interface, and a probe interface. The interface allows access by the handle 126 to the data bus, control lines, and power bus used by a noncontact distance measurement device and other accessories. In an embodiment, the probe end electronics are located in the measurement probe housing 102 on the AACMM 100. In an embodiment, the handle 126 may be removed from the interface and measurement may be performed by a noncontact distance measurement device communicating with the probe end electronics of the AACMM 100 via the interface bus. In an embodiment, the electronic data processing system 134 is located in the base 116 of the AACMM 100, the probe end electronics are located in the measurement probe housing 102 of the AACMM 100, and the encoder systems are located in the bearing cartridge groupings 110, 112, 114. The probe interface may connect with the probe end DSP by any suitable communications protocol, including commercially-available products from Maxim Integrated Products, Inc. that embody the 1-wire® communications protocol 236.

In an embodiment, the base processor system 130 includes the various functional blocks illustrated therein. For example, a base processor function 138 is utilized to support the collection of measurement data from the AACMM 100 and receives raw arm data (e.g., encoder system data) via the arm bus 140 and a bus control module function. The memory function 154 stores programs and static arm configuration data. The base processor system 130 may also include an external hardware option port function for communicating with any external hardware devices or accessories such as a noncontact distance measurement device. A real time clock (RTC) and log, a battery pack interface (IF), and a diagnostic port may also be included in the functionality in an embodiment of the base processor system 130.

The base processor 130 also manages all the wired and wireless data communication with external (remote/host computer) and internal (e.g. user interface 132) devices. The base processor system 130 has the capability of communicating through a communications module 136 with an Ethernet network via an Ethernet function (e.g., using a clock synchronization standard such as Institute of Electrical and Electronics Engineers (IEEE) 1588), with a wireless local area network (WLAN) via a LAN function, and with Bluetooth module via a parallel to serial communications (PSC) function. The base processor system 130 may also include a connection to a universal serial bus (USB) device.

The base processor system 130 transmits and collects raw measurement data (e.g., encoder system counts, temperature readings) for processing into measurement data without the need for any preprocessing. The base processor 138 may send the processed data to the user interface 132 via an RS485 interface (IF). In an embodiment, the base processor 138 may also send the raw measurement data to an external computer. As will be discussed in more detail below, the base processor 138 may compensate for errors, such as synchronous and asynchronous bearing errors, in the measurements of the encoder systems 142.

Turning now to the user interface 132, the angle and positional data received by the base processor is utilized by applications executing on the user interface (e.g. a local or remote computer). Applications may be executed on the user interface 132 support functions such as, but not limited to: measurement of features, guidance and training graphics, remote diagnostics, temperature corrections, control of various operational features, connection to various networks, and display of measured objects.

The electronic data processing system 134 may also include an environmental recorder for recording environmental data. A base power board may be used to provide power to the electronic data processing system 134 using an AC/DC converter and a battery charger control. The base power board may communicate with the base processor system 130 using inter-integrated circuit (I2C) serial single ended bus as well as via a DMA serial peripheral interface (DSPI). The base power board may include a tilt sensor and radio frequency identification (RFID) module via an input/output (I/O) expansion function.

Though shown as separate components, in other embodiments all or a subset of the components may be physically located in different locations and/or functions combined in different manners than that shown in FIG. 2. For example, in one embodiment, the communications module 136 may be physically separated from the base processor 138 by shielding to prevent or mitigate interference.

Figure 4:
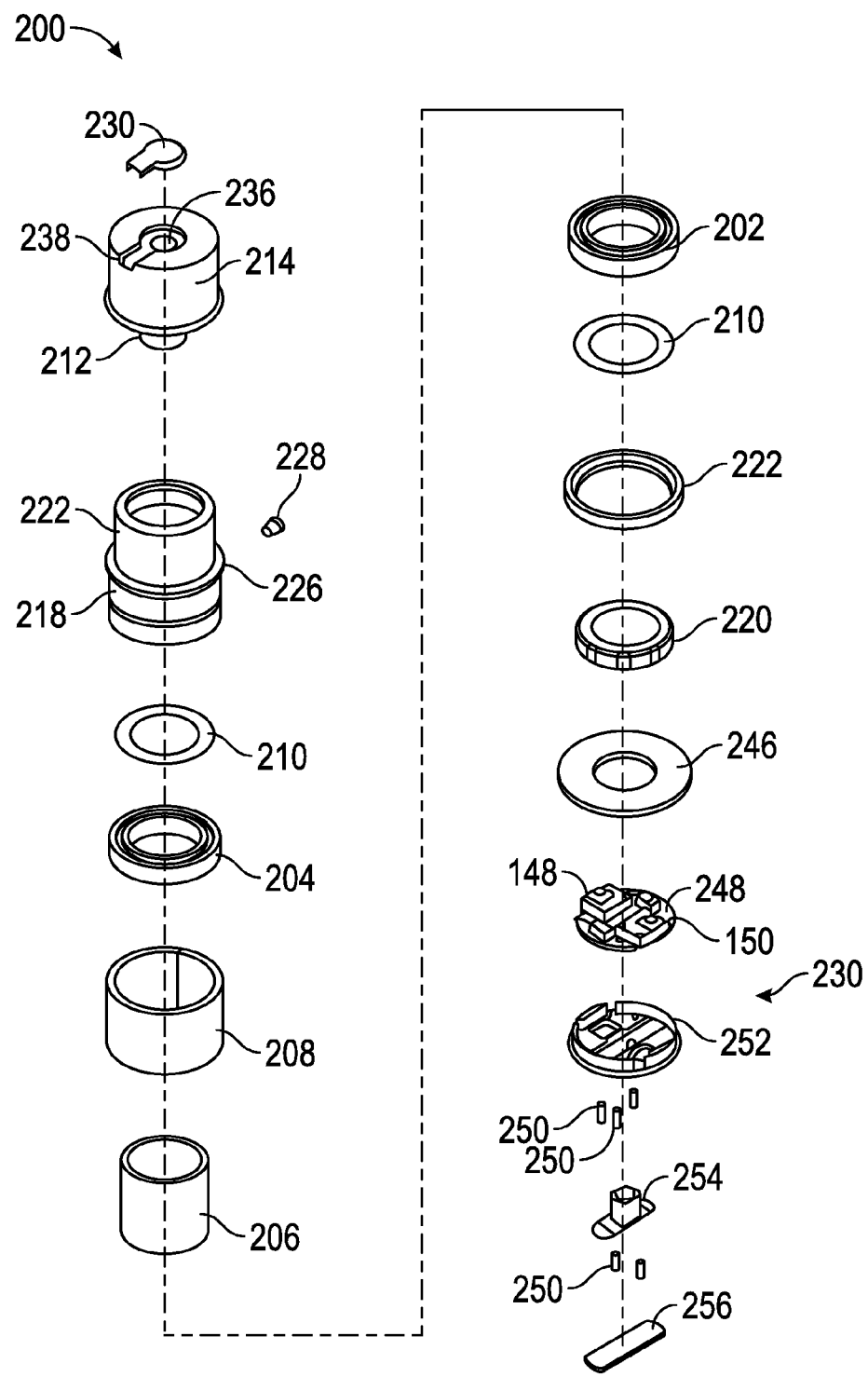
FIG. 4 is an exploded perspective view of a bearing encoder cartridge assembly in accordance with an embodiment.
Figure 5:
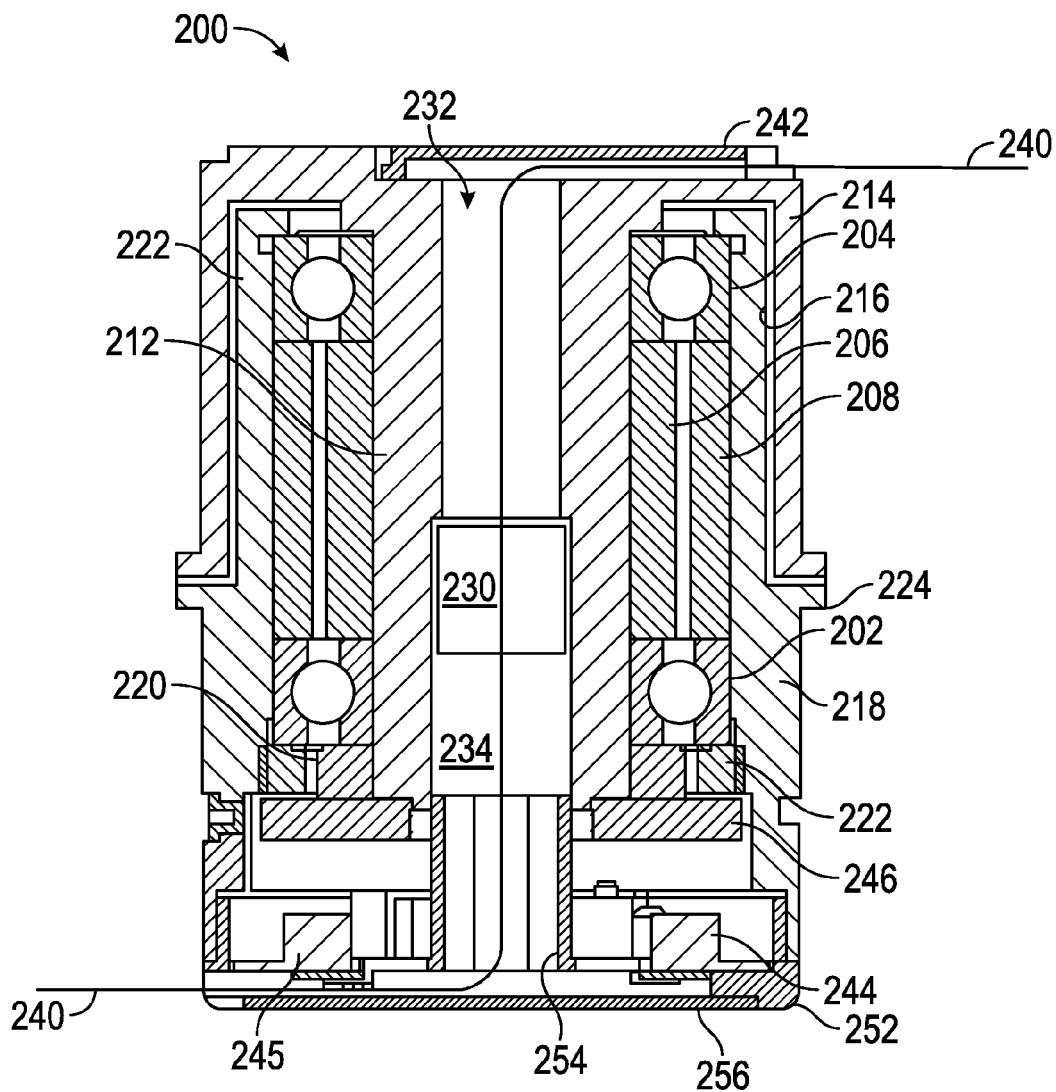
FIG. 5 is a side sectional view of the bearing encoder cartridge of FIG. 4.

Referring now to FIGS. 4-5, an exemplary embodiment is shown of bearing cartridge, such as bearing cartridge used in bearing groupings 110, 112, 114 for example, that include a slip ring assembly that allows for rotation of the arm segments. As discussed above, each of the rotational connections of the articulated arm utilizes a modular bearing/encoder cartridge such as cartridge 200 for example. The cartridges 200 are mounted in the openings of dual socket joints, such as that described in commonly owned U.S. Pat. No. 6,935,036 which is incorporated by reference herein. Each socket joint includes a pair of cylindrical extensions having sockets. Generally the sockets are positioned 90° to one another although other relative angular configurations may be employed. The cartridges 200 define hinge and swivel joints. Modular bearing/encoder cartridges 200 provide advantages in permitting separate manufacturer of a pre-stressed or preloaded dual bearing cartridge on which is mounted the modular encoder components. This bearing encoder cartridge can then be fixedly attached to the external skeletal components, such as dual socket joints for example, of the articulated arm portion 104. The use of such cartridges is advantageous in permitting high-quality, high-speed production of these sophisticated subcomponents of articulated arm portion 104.

It should be appreciated that while embodiments herein illustrate a single size bearing cartridge, this is for exemplary purposes and the claimed embodiment should not be so limited. In some embodiments, there may be as many as four or more different cartridge types, for example two "long" axial cartridges that allow for swivel rotation, and two "short" cartridges that provide a hinge joint. Each cartridge includes a pre-loaded bearing arrangement and a transducer which may comprise a digital encoder. While the length of the cartridge may change, for exemplary purposes, we will describe all types of cartridges with respect to cartridge 200.

The cartridge 200 includes a pair of bearings 202, 204 separated by an inner sleeve 206 and an outer sleeve 208. It is desirable that the bearings 202, 204 be pre-loaded. In one embodiment, the preload is provided by the sleeves 206, 208 being different lengths (inner sleeve 206 is shorter than the outer sleeve 208 by approximately 0.0005 inches) so that upon tightening, a preselected preload is generated on bearings 202, 204. Bearings 202, 204 may be sealed using seals 210 and rotatably mounted on shaft 212. At its upper surface, shaft 212 terminates at a shaft upper housing 214. An annulus 216 (FIG. 5) is defined between shaft 212 and shaft upper housing 214. This entire assembly 202, 204, 210, 212 is positioned within outer cartridge housing 218 with the shaft 212 and its bearing assembly 202, 204 being securely attached to housing 218 using a combination of an inner nut 220 and an outer nut 222. In one embodiment, upon assembly the upper portion 224 of housing 218 may be received within annulus 216. It should be appreciated that the aforementioned preload is provided to bearings 202, 204 upon the tightening of the inner and outer nuts 220, 222 which provide compression forces to the bearings and, due to the difference in length between the sleeves 206, 208, the desired preload will be applied.

In the exemplary embodiment, bearings 202, 204 are duplex ball bearings. In order to obtain the desired level of pre-load, it is desired that the end surfaces of the bearings be parallel. This parallelism affects the evenness of the pre-loading about the circumference of the bearing. Uneven loading may give the bearing a rough, uneven running torque feel and may result in radial run out and reduced encoder performance. Radial run out of the modularly mounted encoder disk may result in an undesirable fringe pattern beneath the encoder head, which can result in encoder angular measurement errors. As discussed in more detail below, both the synchronous and asynchronous errors due to the radial run out may be measured and compensated for during operation.

The angular error of the cartridge 200 is directly related to the separation of the bearings 202, 204. The angular error decreases as the separation of the bearings 202, 204 increases. The sleeves 206, 208 may be used to enhance the separation of the bearings 202, 204. In one embodiment, the cartridge housing 218 and the sleeves 2206, 208 are made from aluminum and are precision machined in length and parallelism. As a result, changes in temperature should not result in differential expansion which could compromise pre-load. As previously mentioned, the pre-load is established by the difference in length between the sleeves 206, 208. Once the nuts 220, 222 are fully tightened, this differential in length will result in the desired bearing pre-load. The use of seals 210 provide sealed bearings since contaminants would affect rotational movement and encoder accuracy, as well as joint feel.

It should be appreciated that while cartridge 500 is illustrated as having a pair of spaced bearings, the cartridge 500 may include a single bearing or three or more bearings. Thus, each cartridge includes at least one bearing.

In the exemplary embodiment, the cartridges may have unlimited rotation. In other embodiments, the cartridge may be limited to rotation over a defined angular range. For limited rotation, a groove may be formed on a flange 226 on the outer surface of housing 218, which provides a cylindrical track to receive a shuttle 228. The shuttle 624 rides within the groove until it abuts a removable shuttle stop, such as a set screw (not shown), whereupon further rotation is precluded. The amount of rotation can vary depending on what is desired. In one embodiment, the shuttle rotation is limited to less than 720 degrees.

In other embodiments, the cartridge may be configured for unlimited rotation. In this latter case, a slip-ring assembly 230 is used. In one embodiment, the shaft 212 has a hollow or axial opening 232 therethrough, which has a larger diameter section 234 at one end. On one end of the axial opening 234 is a slip ring assembly 230. The slip ring assembly 230 may consist of any commercially available slip ring; in one embodiment, the slip ring assembly 230 comprises an H-series slip ring available from IDM Electronics Ltd. of Reading, Berkshire, United Kingdom. The slip ring assembly is non-structural with respect to the preloaded bearing assembly. The slip ring assembly 230 provides substantially no mechanical/structural function but rather provides electrical or signal transfer functions. Axial opening 234 at an aperture 236 which communicates with a channel 238 sized and configured to receive wiring 240 from the slip ring assembly 230. Such wiring is secured in place and protected by a wire cover 242, which is snapped onto and is received into the channel and aperture.

As discussed herein, cartridge 200 includes both a preloaded bearing structure and an optical encoder structure. In the exemplary embodiment, the optical encoder structure includes a first and second read head 148, 150 and a glass or grating disk 246. In this embodiment, the pair of read heads 148, 150 are positioned 180 degrees apart on a read head connector board 248. Connector board 248 is attached via fasteners 250 to a mounting plate 252. Grating disk 246 is attached to the lower surface of shaft 212, such as with an adhesive for example, and is spaced apart from and in alignment with read heads 148, 150. A wire funnel 254 and sealing cap 256 provide the final outer covering to the end of housing 218. Wire funnel 254 captures and retains the wiring 240. It should be appreciated that the encoder head disk 246 will be retained and rotate with shaft 212. It should be further appreciated that while the illustrated embodiment shows two read heads 636, more than two read heads may also be used. In one embodiment, a third read head is positioned 90 degrees from the first and second read heads 148, 150 Still further, in other embodiments, the positions of the read heads 148, 150 and the grating disk 246 may be reversed whereby the read heads 148, 150 rotate with the shaft 212.

Figure 6:
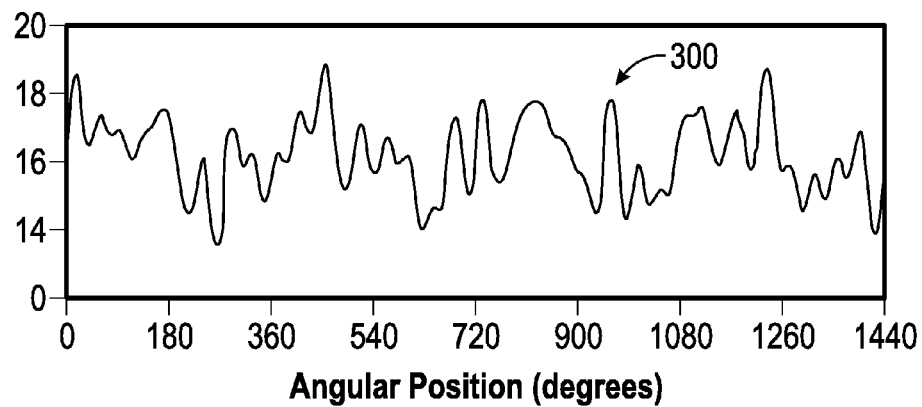
FIG. 6 is a waveform diagram derived from a bearing encoder cartridge in accordance with an embodiment of the invention.
Figure 8:
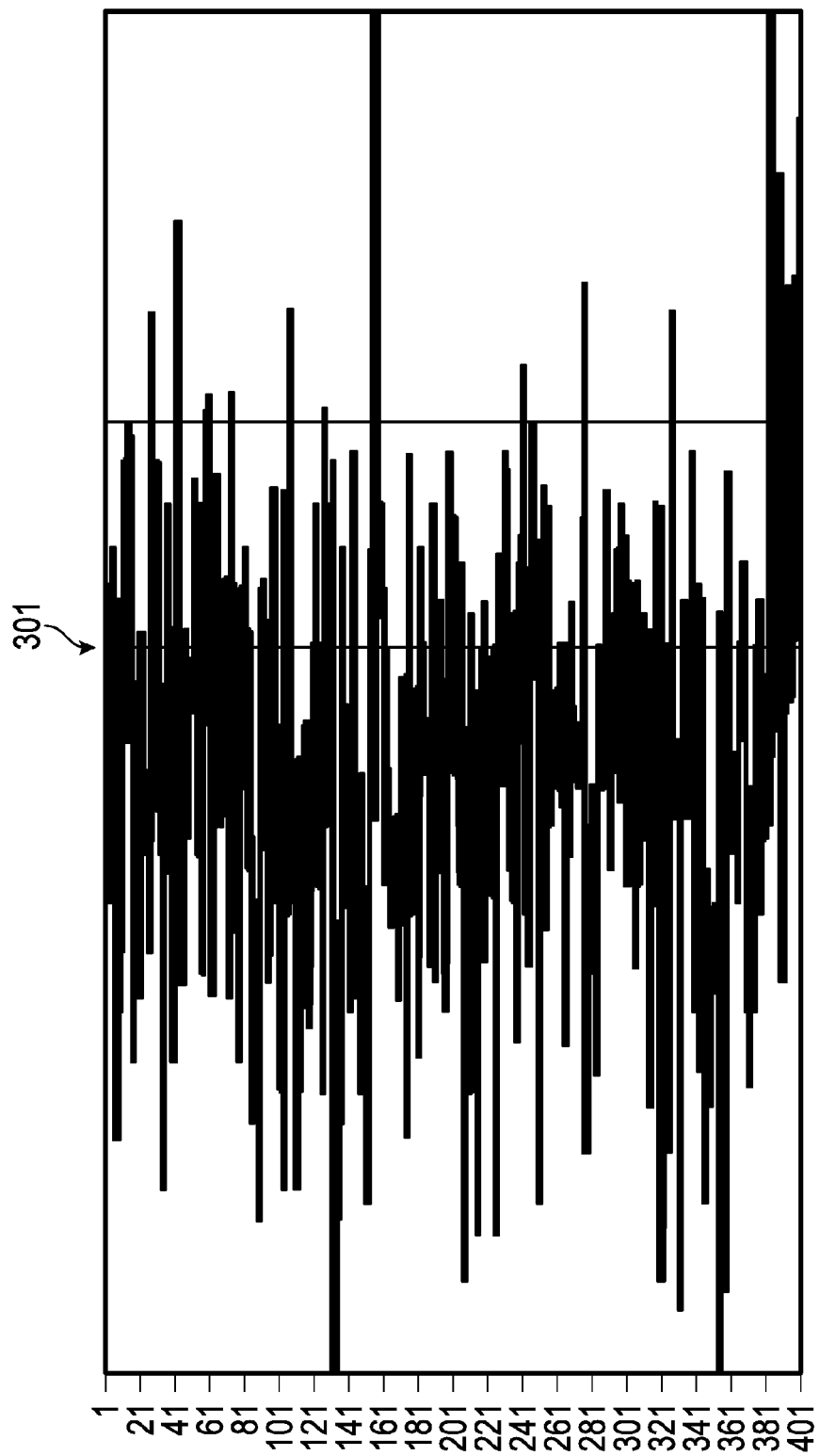
FIG. 8 is an exemplary waveform of a bearing encoder cartridge in accordance with an embodiment of an invention.

As discussed above, bearing run out errors may result in errors angular rotations of the cartridge 200 as determined by the encoder measurements. It should be appreciated that it is desirable to reduce or substantially eliminate such errors to obtain higher levels of accuracy in the metrology measurements. FIG. 6 illustrates an error signal 300 due to bearing run out amplitude as a function of angular position for a typical bearing spindle as it is rotated through four rotations (results courtesy of Wolfgang Holzhauer Ph.D. from his "Tutorial on Axis of Rotation," Annual Meeting of the American Society for Precision Engineering (ASPE), Nov. 1, 1999). As illustrated, the signal does not repeat identically from one rotation to the next. This is due to the combination of synchronous errors (those that repeat substantially identically each rotation) and asynchronous errors. It should be appreciated that while the waveform 300 appears to be smooth, the waveform may be have substantial deviations and appear to be random as shown by the waveform 301 of FIG. 8.

Figure 7:
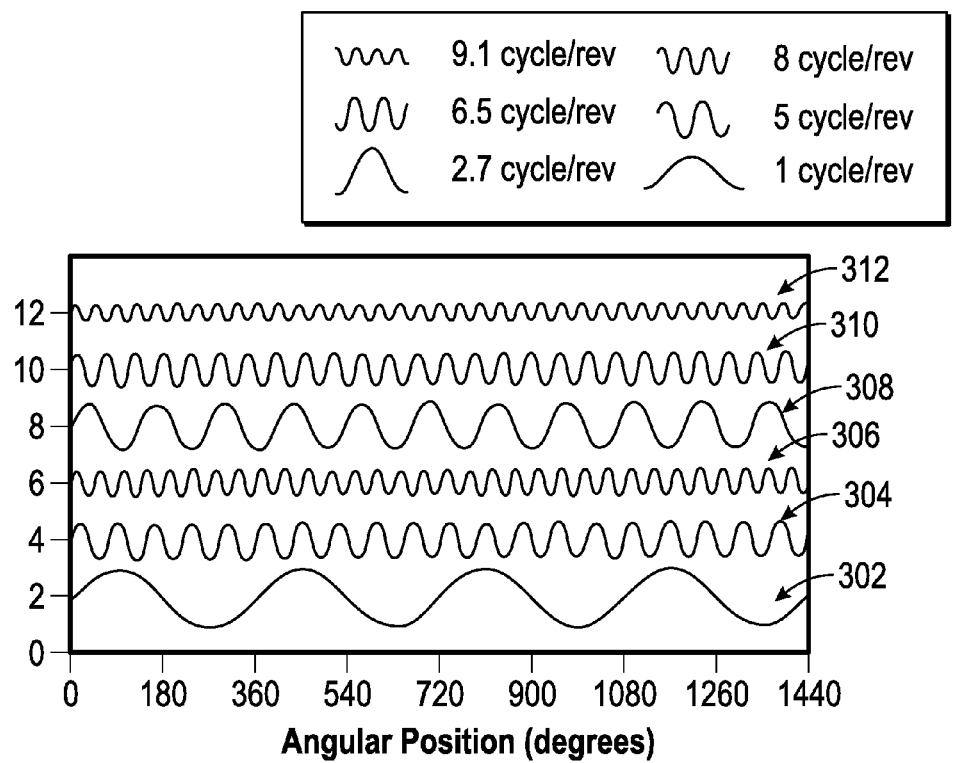
FIG. 7 is a series of sinusoidal waveform diagrams that have been decomposed from the waveform of FIG. 6.

This signal may be decomposed into a series of sinusoidal waveforms using a Fourier Transform as illustrated in FIG. 7. The synchronous errors are represented by the waveforms 302, 304, 306 corresponding to the 1, 5 and 8 cycle/revolution (integer multiples). The asynchronous errors are represented by any non-integer multiple, such as the waveforms 308, 310, 312 corresponding to the 2.7, 6.5 and 9.1 cycles/revolution. When the sinusoidal waveforms are summed (FIG. 6), the resulting waveform appears to be random. However, by decomposing the error signal using FFT, the synchronous and asynchronous errors may be separated.

Figure 9:
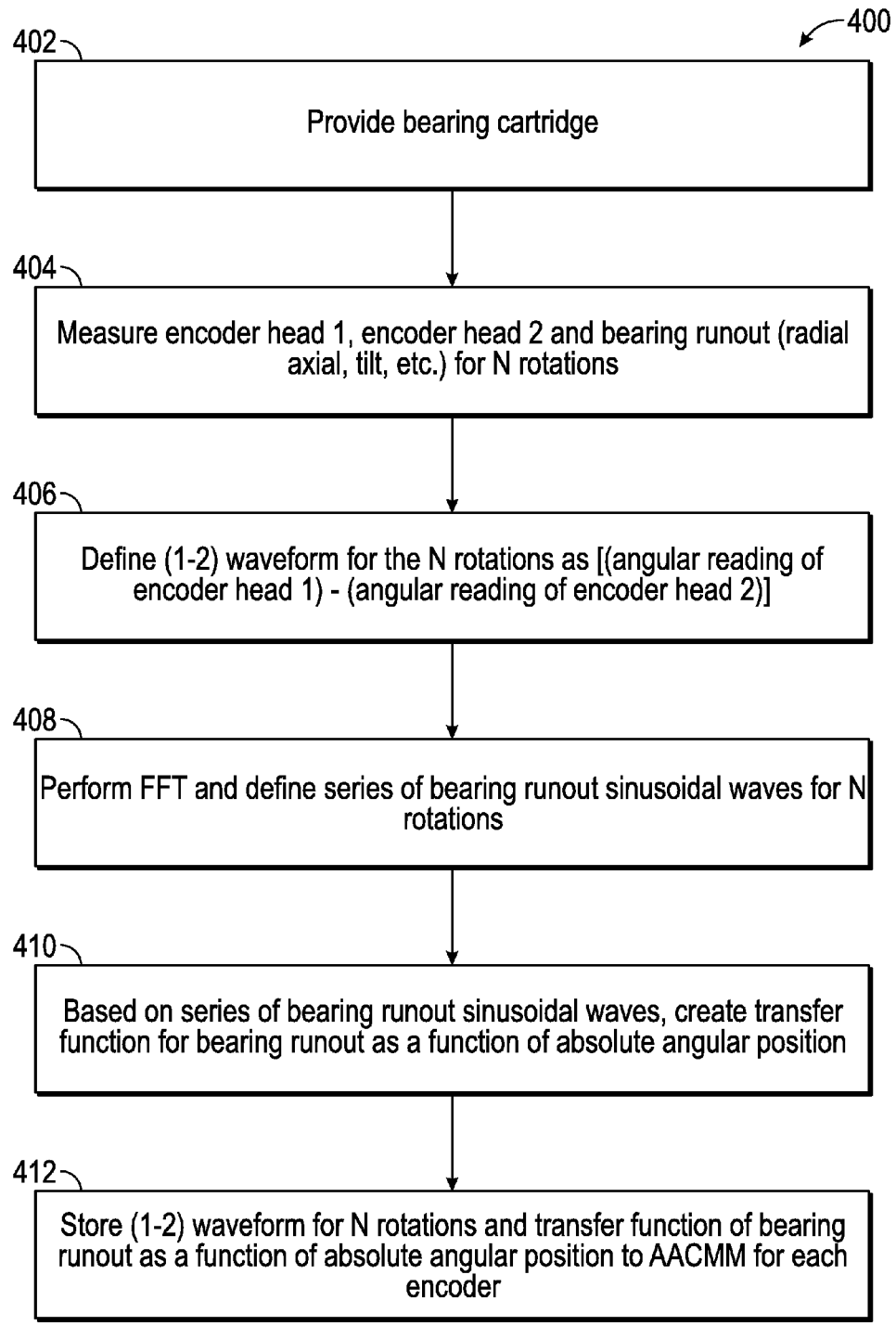
FIG. 9 is a flow diagram illustrating a method of mapping a bearing runout error for bearing cartridges used with the AACMM of FIG. 1.
Figure 10:
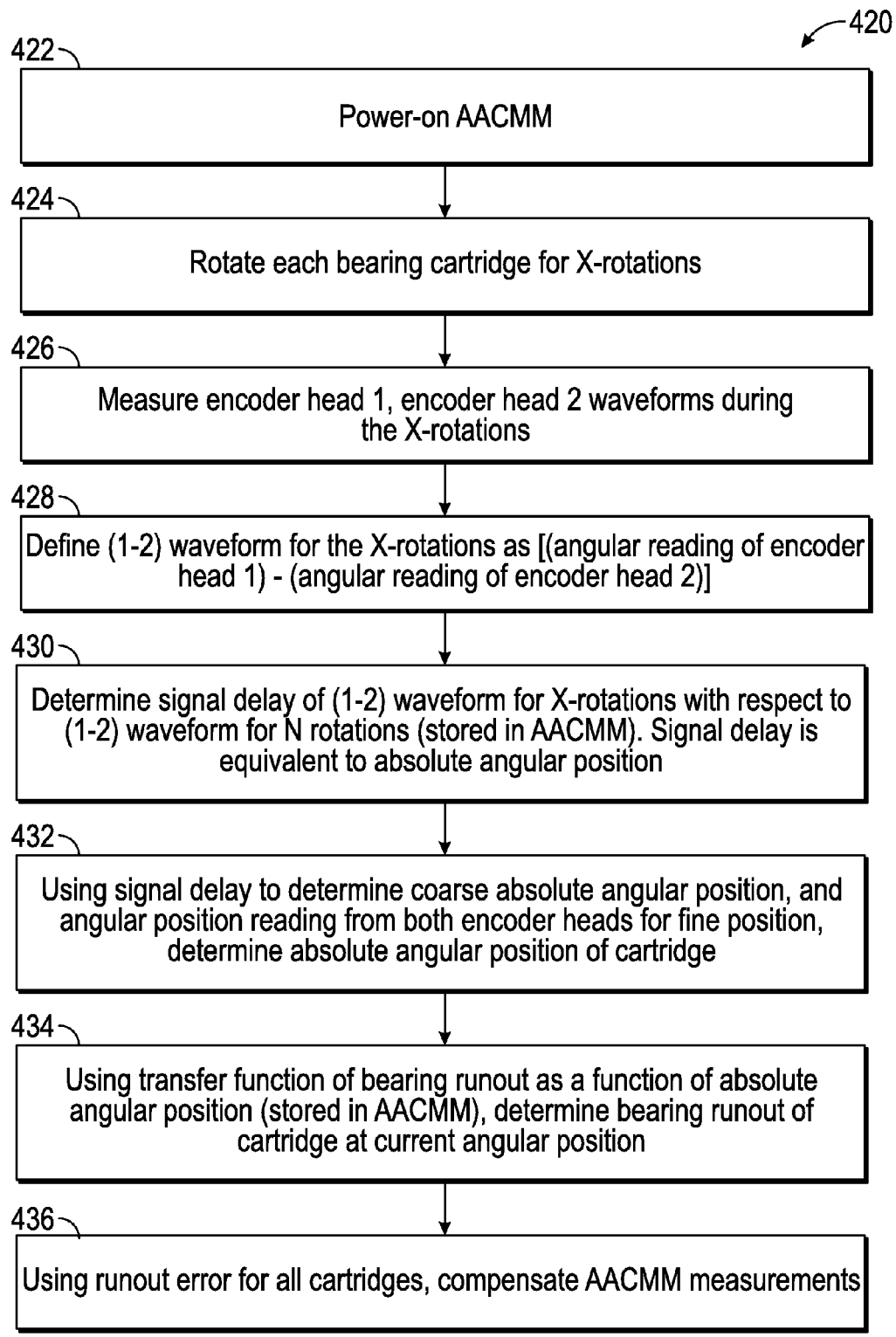
FIG. 10 is a flow diagram illustrating a method of compensating for bearing runout error in the AACMM of FIG. 1.

Referring now to FIGS. 9 and 10 a method is shown for compensating for synchronous and asynchronous bearing run out error in an AACMM 100. During the manufacturing process, each bearing cartridge 110, 112, 114 is tested and the bearing runout (radial, axial, tilt) measured. In one embodiment, the bearing cartridges 110, 112, 114 are tested and measured in a manner such as that described in commonly owned U.S. Patent Application Ser. No. 61/936,416 entitled Apparatus and Method to Compensate Bearing Runout in an Articulated Arm Coordinate Measurement Machine filed Feb. 6, 2014, the contents of which are incorporated by reference herein.

To compensate the bearing runout, the error (e.g. the runout amplitude as a function of angular position) is characterized for each bearing cartridge 200. A method 400 starts in block 402 by receiving the bearing cartridge 2000 with the encoder grating disk aligned. It should be appreciated that the grating disk will not be completely concentric with the axis of rotation, such that the signal of the first read head 148 and the second read head 150 will differ. As a result, when the signal from the second read head 150 is subtracted from the first read head 148 (hereinafter referred to as the (1-2) waveform), a sinusoidal waveform is produced. As the concentricity is improved, the amplitude of the sinusoidal waveform is reduced. During the manufacturing process, the alignment is adjusted until the amplitude is below a predetermined threshold and the grating disk is deemed "centered."

With encoder glass aligned, the method 400 proceeds to block 404 where the bearing cartridge 200 is tested to determine bearing runout (radial, axial, tilt) for a predetermined number "N" revolutions. As used herein, the term "revolution" or "lap" referred to the rotation of the bearing cartridge 200 360 degrees. For example, three revolutions would rotate the bearing cartridge 200 for 1080 degrees. The rotation of the bearing cartridge is started from an arbitrary position that defines the "absolute zero" position for that particular bearing cartridge. The number of revolutions "N" is selected to be sufficiently large enough provide enough data points at a high enough density (with respect to angular position) to fully define the series of sinusoidal waveforms. As the bearing cartridge is rotated through the "N" turns, the signals from the read heads 148, 150 are measured and recorded. The $(1-2)_N$ waveform is defined in block 406 by subtracting the signal from the first read head 148 from the second read head 150 as a function of angular position. A Fourier Transform is performed on the bearing runout to define a series of sinusoidal waveforms (FIG. 7) for "N" rotations.

Each of the sinusoidal waveforms is then used to create a Fourier series that may be used as a transfer function of the bearing runout as a function of the absolute angular position (based on the absolute zero position) in block 410. It should be appreciated that these Fourier series capture both the synchronous and asynchronous components of the bearing run out error. The $(1-2)_N$ waveform for N rotations and the transfer function (Fourier series) of the bearing run out as a function of absolute angular position is then stored in memory for each bearing cartridge. During the assembly of the AACMM 100, the associated $(1-2)_N$ waveform and transfer function for each of the bearing cartridges 200 is transferred to and stored in memory 154 and may be used by the base processor 138 to compensate the measurements made during operation for the bearing run out.

If the AACMM 100 were continuously powered, the compensation for bearing error would be straight forward. The number of rotations of each bearing cartridge 110, 112, 114 could be tracked by the base processor 138 and the transfer function could be used to determine the runout error for that position and the compensation performed. However, in most cases the AACMM 100 will be unpowered at some point and the bearing cartridges rotated. As a result, the rotation count relative to absolute zero of each bearing cartridge 110, 112, 114 may be lost each time the AACMM 100 is turned off (unpowered).

Referring now to FIG. 10, a method 420 is shown for compensating for runout error for an AACMM 100 that has been in an unpowered state. The method 420 starts in block 422 with the AACMM 100 being turned-on to a powered state. The user then rotates each bearing cartridge grouping 110, 112, 114 for a predetermined number of "X" rotations. It should be appreciated that the number of predetermined rotations is selected to be sufficient to identify the rotation count as discussed below. As the bearing cartridges 200 are rotated, the waveforms for each read head 148, 150 in each of the bearing cartridges 200 is recorded in block 426. The $(1-2)_X$ waveform for the X-rotations is defined in block 428.

The method 420 then proceeds to compare the $(1-2)_X$ waveform to the $(1-2)_N$ waveform in block 430. By comparing the two waveforms, it is determined where the $(1-2)_X$ waveform substantially matches the $(1-2)_N$ waveform and an offset or signal delay for the $(1-2)_X$ waveform from absolute zero may be defined. The method 420 may then, in block 432, combine the course absolute angular position (based on the signal delay) and encoder read head readings to determine fine absolute position for each bearing cartridge. It should be appreciated that the signal delay estimation described can be accomplish with the use of Fourier Transforms, and this method is for exemplary purposes. In another embodiment, a method of cross-correlation may be used for the signal delay estimation. It should also be appreciated that this signal delay estimation could potentially estimate a signal delay such that the absolute angular position is outside of the X-rotations performed in block 404, which allows for the determination of absolute angular position when the cartridge has been rotated beyond the positions measured in the initial X-rotations.

Using the transfer function and the fine absolute angular position, the bearing run out of the bearing cartridge at the current angular position may be determined in block 434 using the transfer function. With the bearing run out determined for all of the bearing cartridges 110, 112, 114, the AACMM measurements may be compensated for both synchronous and asynchronous bearing runout. It should be appreciated that this provides advantages in improving the measurements made by the AACMM 100.

Figure 11:
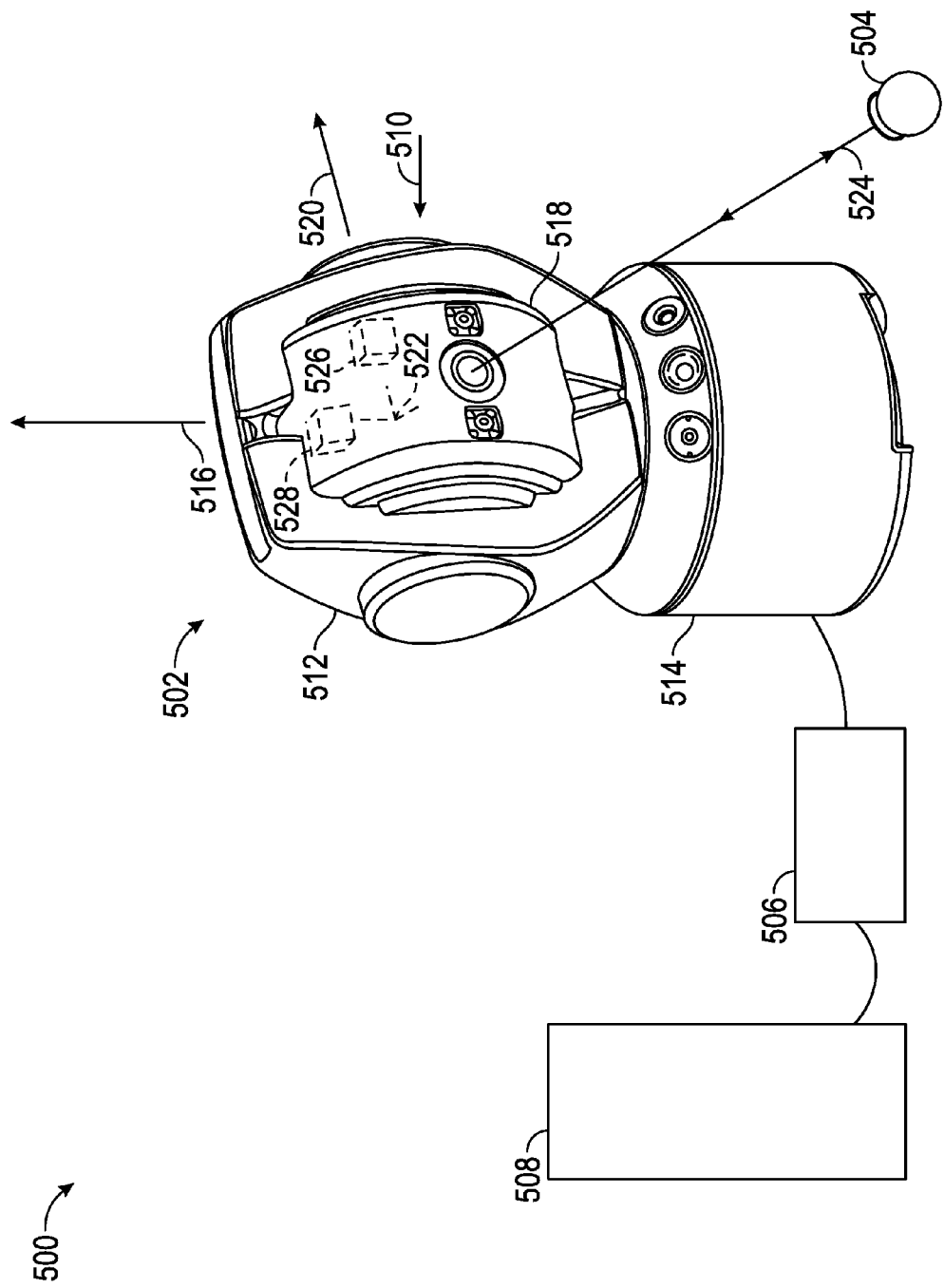
FIG. 11 is a perspective view of a laser tracker metrology device in accordance with an embodiment of the invention.

It should be appreciated that the methods of compensating for bearing runout to improve accuracy and determine the rotation position is not limited to the AACMM 100 and the claimed invention should not be so limited. Referring now to FIG. 11, an exemplary laser tracker device 500 is illustrated. The laser tracker device 500 includes a laser tracker 502, a retroreflector target 504, an electronic data processing system 506, and an optional auxiliary computer 508. The laser tracker 500 may be similar to that described in commonly owned U.S. Provisional Application Ser. No. 61/842,572 filed on Jul. 3, 2013, the contents of which are incorporated herein by reference. It should be appreciated that while the electronic data processing system 506 is illustrated external to the laser tracker 500, this is for exemplary purposes and the electronic data processing system 506 may be arranged within the housing of the laser tracker 500. An exemplary gimbaled beam-steering mechanism 510 of laser tracker 500 comprises a zenith carriage 512 mounted on an azimuth base 514 and rotated about an azimuth axis 516. A payload 518 is mounted on the zenith carriage 512 and rotated about a zenith axis 520. Zenith axis 520 and azimuth axis 516 intersect orthogonally, internally to tracker 500, at gimbal point 522, which is typically the origin of the local coordinate system frame of reference for distance measurements.

A laser beam 524 virtually passes through the gimbal point 522 and is pointed orthogonal to zenith axis 520. In other words, laser beam 524 lies in a plane approximately perpendicular to the zenith axis 520 and that passes through the azimuth axis 516. Outgoing laser beam 524 is pointed in the desired direction by rotation of payload 518 about zenith axis 520 and by rotation of zenith carriage 512 about azimuth axis 516. A zenith angular encoder 526, internal to the tracker 520, is attached to a zenith mechanical axis aligned to the zenith axis 520. An azimuth angular encoder 528, internal to the tracker, is attached to an azimuth mechanical axis aligned to the azimuth axis 516. The zenith and azimuth angular encoders 526, 528 measure the zenith and azimuth angles of rotation to relatively high accuracy. Outgoing laser beam 524 travels to the retroreflector target 504, which might be, for example, a spherically mounted retroreflector (SMR). The angular encoders 526, 528 may be the same as the encoders of bearing cartridges 200 having two read heads. Due to the larger space available within the laser tracker 500, the encoders 528, 526 may include three or four read heads instead of two read heads used in the bearing cartridge 200.

The distance to the retroreflector target 504 is determined by the electronic data processing system 506 in response to a signal from a measuring device, such as an absolute distance meter (ADM) or an interferometer for example. By measuring the radial distance between gimbal point 522 and retroreflector 504, the rotation angle about the zenith axis 520, and the rotation angle about the azimuth axis 516, the position of retroreflector 504 and thus the three-dimensional coordinates of the object being inspected is found by the electronic data processing system 506 within the local spherical coordinate system of the tracker.

Figure 12:
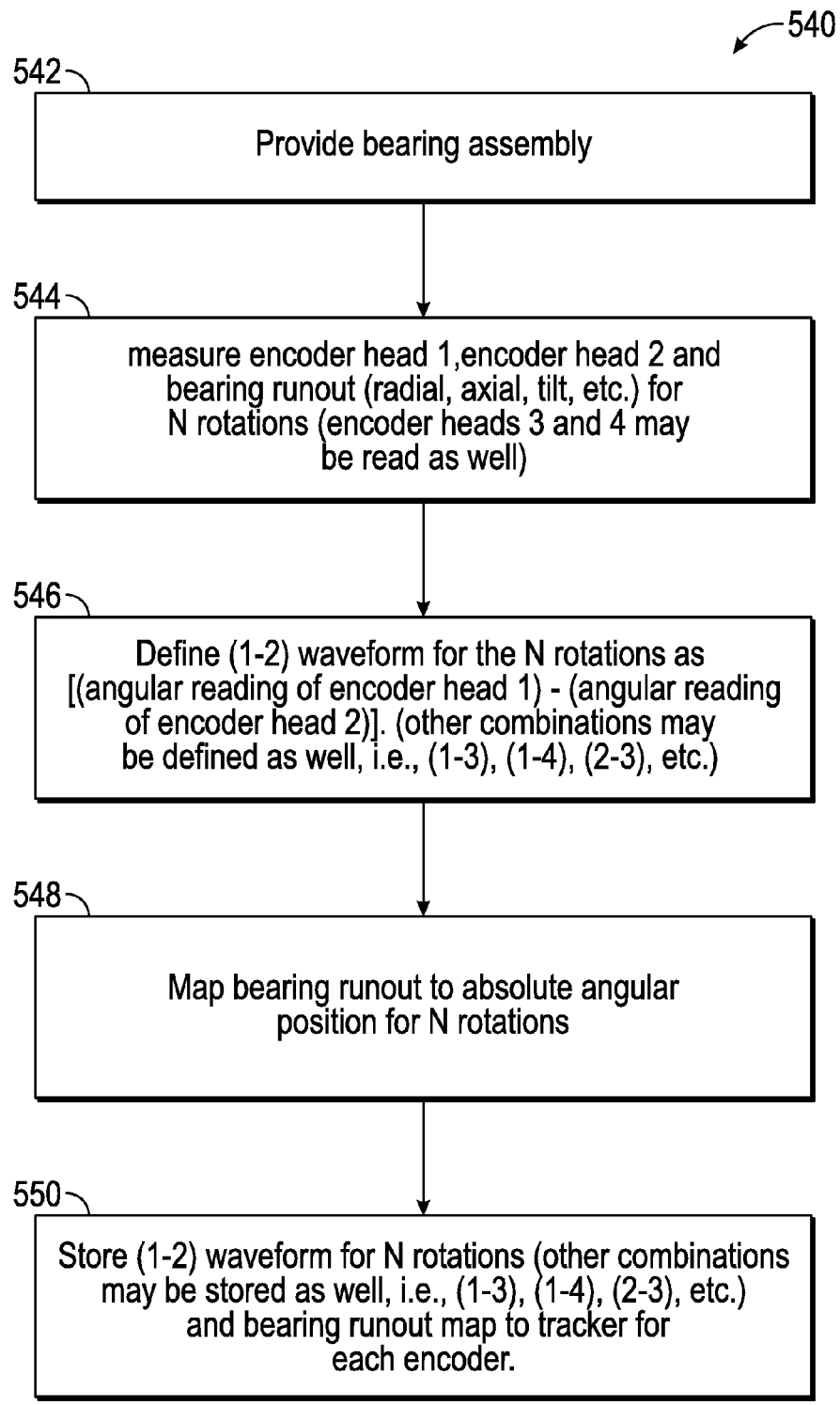
FIG. 12 is a flow diagram illustrating a method of mapping bearing runout error for encoders used with the laser tracker of FIG. 10.

It should be appreciated that the encoders 526, 528 are operably coupled to bearings via axles that allow the payload 518 to be rotated about the azimuth axis 516 and the zenith axis 520. As a result, it is desirable to compensate for the bearing run out error to improve the accuracy of the measurements. Referring now to FIG. 12, a method 540 is illustrated for characterizing the bearing run out error in a manner that allows for compensation during operation. The method 540 starts in block 542 with receiving the bearing axle assembly with the encoder glass aligned. As discussed above, a sinusoidal waveform is produce by subtracting the signals from opposing read heads, to produce the (1-2) waveform. It should be appreciated that in embodiments where the encoder includes additional read heads, such as four read heads for example, additional sinusoidal waveforms may be generated for opposing read heads, such as a (3-4) waveform from the third and fourth read heads for example. The alignment process improves the concentricity of the glass until the amplitude of the sinusoidal waveform is within a predetermined threshold.

With the glass aligned, the azimuth and zenith axle assemblies (not shown), including the bearings and encoders 526, 528, are mounted to a test fixture. The test fixture may be similar to that described in commonly owned U.S. patent application Ser. No. 13/888,442 entitled "An Apparatus and Method to Compensate Bearing Runout in a Laser Tracker" filed May 16, 2012, the contents of which are incorporated herein by reference. Using the test fixture, the bearings and encoders are rotated. During the rotation, the bearing run out (radial, axial, tilt) is measured and encoder head signals are recorded as a function of angular position for "N" rotations as described in block 544. As with the AACMM 100, the rotations are started from an arbitrary position that is defined as the "absolute zero" or starting position for the assembly. Unlike an AACMM, where the arm portions 104, 106 may be rotated an unlimited or at least a substantially large number of rotations by a user during the course of operation, the rotation of the laser tracker 500 is controlled by motors (not shown) as is known in the art. As a result, the number of rotations about the axis 516, 520 may be limited to a relatively small number, such as 20 or 50 for example. Therefore, the number of rotations "N" is selected to be greater than the expected number of rotations for the assembly during the course of operation. The limiting of the number of rotations may be accomplished via a physical stop incorporated into the azimuth and zenith axle assemblies, or by the electronic data processing system 506. In one embodiment, the electronic data processing system 506 returns the payload 518 and the zenith carriage 512 to a "home" position (e.g. angular position of absolute zero or another predetermined position between absolute zero and the Nth rotation) after measurements have been completed and prior to powering to an off-state.

The method 540 then proceeds to block 546 where the $(1-2)_N$ waveform is defined for the N rotations. In embodiments where the encoders include additional read heads, other combinations of waveforms (e.g. (1-3), (1-4), (2-3), etc.) may also be defined. The defining of multiple waveforms may provide advantages in improving the determination of the lap count. For clarity, the encoder waveform will be referred to herein as the $(1-2)_N$ waveform, but it should be understood that the other waveform combinations may be used as well. The method 540 then proceeds to block 548 where the bearing runout measurements are mapped to the absolute angular position for N rotations. Finally, the $(1-2)_N$ waveform and the bearing runout map are stored in memory on the laser tracker 500 in block 550.

Figure 13:
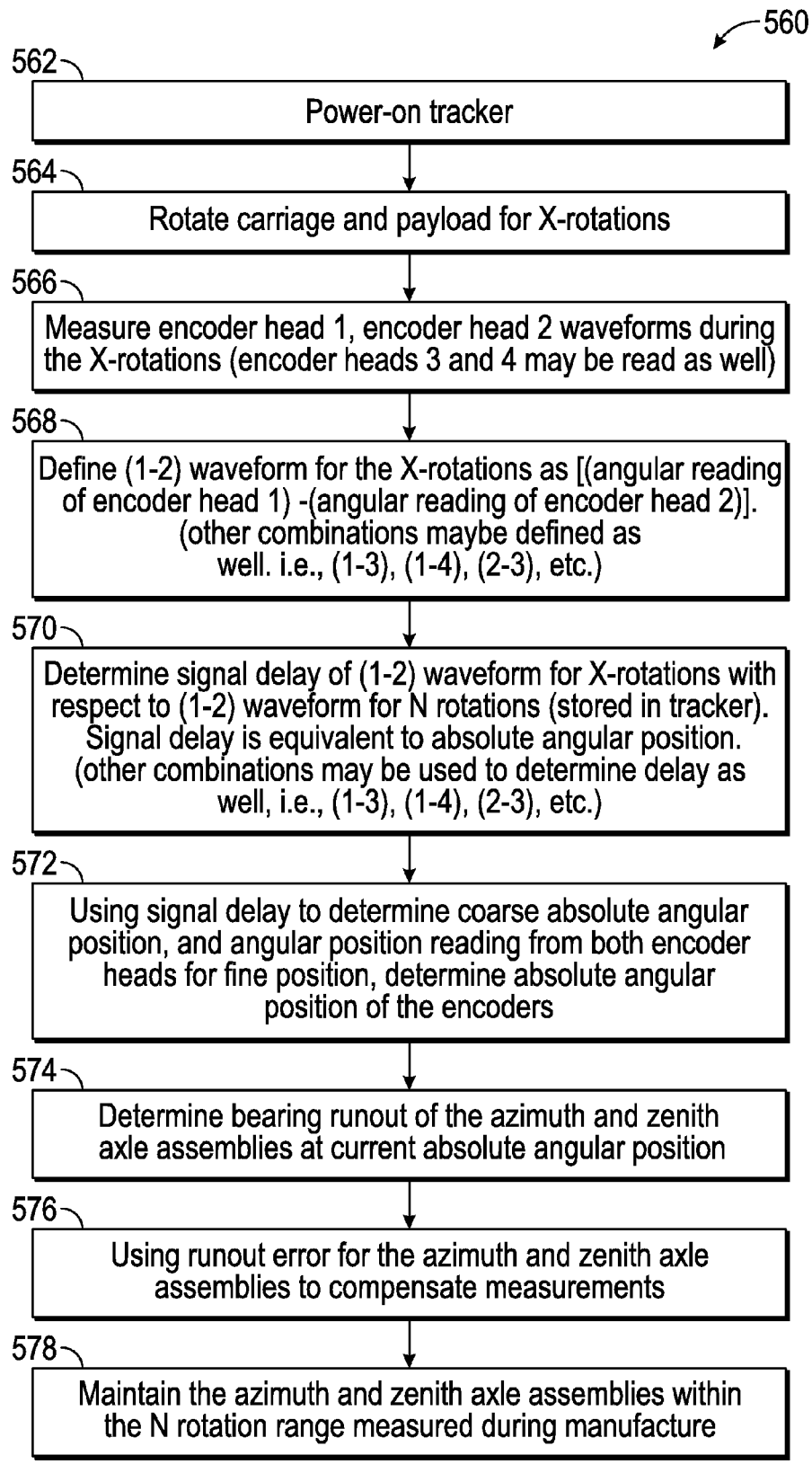
FIG. 13 is a flow diagram illustrating a method of compensating for bearing runout error in the laser tracker of FIG. 10.

Referring now to FIG. 13, a method 560 is illustrated for compensating for bearing runout error and determining the angular position of the encoders. The method 560 starts in block 562 where the laser tracker 500 is powered to an on-state. The carriage 512 and payload 518 are then rotated for "X" rotations about the azimuth axis 516 and zenith axis 520 in block 564. The rotation of the carriage 512 and payload 518 may be performed simultaneously or sequentially.

While the carriage 512 and payload 518 are rotating through the "X" rotations, the waveforms generated by the encoders 526, 528 read heads are recorded in block 566. The method 540 then proceeds in block 568 to define an $(1-2)_X$ waveform for the "X" rotations for each of the axis 516, 520. It should be appreciated that where the encoder includes more than two read heads, additional or different waveforms ((1-3), (1-4), (2-3), etc.) may also be defined. With the $(1-2)_X$ waveform(s) defined, an offset or signal delay from absolute zero is determined in block 570 by comparing each $(1-2)_X$ waveform to the corresponding $(1-2)_N$ waveform and finding where the $(1-2)_X$ waveform matches or substantially matches the $(1-2)_N$ waveform. Using the signal delay, the method 540 determines the coarse absolute angular positions of the azimuth and zenith axle assemblies. The angular position reading from the encoders 526, 528 are combined with the coarse absolute angular positions to determine the fine absolute angular positions of the azimuth and zenith assemblies, as described in block 572. Thus the absolute angular position for the carriage 512 and payload 518 may be determined.

Once the position of the carriage 512 and payload 518 is known, the method determines the bearing runout of the azimuth and zenith axle assemblies as shown in in block 574 based on the bearing runout map as a function of angular position for each encoder 526, 528. Using the runout error from the bearing runout map, the measurements performed by the laser tracker 500 may be compensated for both the synchronous and asynchronous bearing runout errors in block 576. Finally, in one embodiment, the laser tracker 500 is configured in block 578 to maintain the azimuth and zenith axle assemblies within the "N" rotation range measured during the manufacturing process.

Technical effects and benefits include the compensation of measurements for both synchronous and asynchronous errors in bearing runout. Further technical effects and benefits include allowing the determination of an angular position of a bearing assembly having an encoder based on an encoder waveform. Still further technical effects and benefits include determination of the angular position of a bearing assembly when the bearing assembly is rotated during a device unpowered-state.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method of determining an angular rotation position of a metrology device, the method comprising:
   providing an encoder coupled to at least one bearing, the encoder having at least a first read head and a second read head, the encoder configured to measure in operation an angular rotation of the at least one bearing;
   rotating the at least one bearing for a predetermined number of rotations;
   generating a first signal with the first read head and a second signal with the second read head in response to the rotation of the at least one bearing;
   defining a first waveform by subtracting the first signal from the second signal;
   perform a Fourier analysis on the first waveform to define a series of sinusoidal waves for the predetermined number of rotations;
   generating with a processor circuit operably coupled to the metrology device a transfer function of bearing runout based on the series of sinusoidal waves as a function of absolute angular position of the at least one bearing; and
   storing, in a memory of the processor circuit, the first waveform and the transfer function.

2. The method of claim 1 further comprising:
   coupling the at least one bearing to the metrology device;
   powering the metrology device to a powered-on state;
   rotating the at least one bearing for a second predetermined number of rotations;
   measuring a third signal from the first read head and a fourth signal from the second read head while the at least one bearing is rotating for the second predetermined number of rotations;
   defining a second waveform by subtracting the third signal from the fourth signal;
   determining a signal delay of the second waveform with respect to the first waveform; and
   determining an angular position of the at least one bearing from the signal delay.

3. The method of claim 2 further comprising:
   determining a bearing error for the at least one bearing based at least in part on the determined angular position and the transfer function;
   making a measurement with the metrology device; and
   compensating the measurement based at least in part on the determined bearing error.

4. The method of claim 3 further comprising defining an absolute zero position, wherein the angular position is relative to the absolute zero position.

5. The method of claim 3 wherein the signal delay is estimated using Fourier Transforms.

6. The method of claim 3 further comprising determining a first sinusoidal waveform by subtracting a first read head signal from the first read head with a second read head signal from the second read head.

7. The method of claim 6 further comprising adjusting an alignment of the first read head and the second read head to an axis of rotation of the at least one bearing and determining a second sinusoidal waveform by subtracting a third read head signal from the first read head and a fourth read head signal from the second read head, the second sinusoidal waveform having a smaller amplitude than the first sinusoidal waveform.

8. The method of claim 3 wherein the metrology device is an articulated arm coordinate measurement machine.

9. The method of claim 3 wherein the metrology device is a laser tracker.

10. A method of determining an angular rotation position of a metrology device, the method comprising:
    providing the metrology device having a manually positionable articulated arm portion having opposed first end and second end, the arm portion including a plurality of connected arm segments, wherein the plurality of connected arm segments includes a first arm segment and a second arm segment, the metrology device further having a processor circuit having a memory;
    providing an encoder coupled to at least one bearing, the encoder and the at least one bearing configured to couple between the first arm segment and the second arm segment, the encoder having at least a first read head and a second read head, the encoder configured to measure in operation an angular rotation of the at least one bearing, wherein the encoder is configured to transmit a signal to the processor circuit;
    rotating the at least one bearing for a predetermined number of rotations;
    generating a first signal with the first read head and a second signal with the second read head in response to the rotation of the at least one bearing;
    defining a first waveform by subtracting the first signal from the second signal;
    perform a Fourier analysis on the first waveform to define a series of sinusoidal waves for the predetermined number of rotations;

generate a transfer function based on the series of sinusoidal waves as a function of absolute angular position; and storing, in the memory, the first waveform and the transfer function.

11. The method of claim 10 further comprising:

coupling the at least one bearing to the first arm segment and the second arm segment;

powering the metrology device to a powered-on state;

rotating one of the first arm segment or the second arm segment and the at least one bearing for a second predetermined number of rotations;

measuring a third signal from the first read head and a fourth signal from the second read head while the at least one bearing is rotating for the second predetermined number of rotations;

defining a second waveform by subtracting the third signal from the fourth signal;

determining a signal delay of the second waveform with respect to the first waveform; and determining an angular position of the at least one bearing from the signal delay.

12. The method of claim 11 further comprising:

determining a bearing error for the at least one bearing based at least in part on the determined angular position and the transfer function;

determining, with the processor circuit, three-dimensional coordinates of at least one point on a surface of an object with the metrology device; and changing with the processor circuit the three-dimensional coordinates based at least in part on the determined bearing error.

13. The method of claim 12 further comprising defining an absolute zero position, wherein the angular position is relative to the absolute zero position.

14. The method of claim 12 wherein the signal delay is estimated using Fourier Transforms.

15. A method of determining an angular rotation position of a metrology device, the method comprising:

providing a laser tracker having a structure configured to rotate about a first axis and a second axis, a first light source that launches a first light beam from the structure, a distance meter, and a processor circuit having memory;

providing an encoder coupled to at least one bearing, the encoder and the at least one bearing configured to couple to the laser tracker and rotate the structure about the first axis, the encoder having at least a first read head and a second read head, the encoder configured to measure in operation an angular rotation of the at least one bearing, wherein the encoder is configured to transmit a signal to the processor circuit;

rotating the at least one bearing for a predetermined number of rotations;

generating a first signal with the first read head and a second signal with the second read head in response to the rotation of the at least one bearing;

defining a first waveform by subtracting the first signal from the second signal;

perform a Fourier analysis on the first waveform to define a series of sinusoidal waves for the predetermined number of rotations;

generate a transfer function based on the series of sinusoidal waves as a function of absolute angular position; and storing, in the memory, the first waveform and the transfer function.

16. The method of claim 15 further comprising:

coupling the at least one bearing to the structure;

powering the laser tracker to a powered-on state;

rotating one of the structure and the at least one bearing about the first axis for a second predetermined number of rotations;

measuring a third signal from the first read head and a fourth signal from the second read head while the at least one bearing is rotating for the second predetermined number of rotations;

defining a second waveform by subtracting the third signal from the fourth signal;

determining a signal delay of the second waveform with respect to the first waveform; and determining an angular position of the at least one bearing from the signal delay.

17. The method of claim 16 further comprising:

determining a bearing error for the at least one bearing based at least in part on the determined angular position and the transfer function;

determining, with the processor circuit, three-dimensional coordinates of at least one point on a surface of an object with the laser tracker; and changing with the processor circuit the three-dimensional coordinates based at least in part on the determined bearing error.

18. The method of claim 17 further comprising defining an absolute zero position, wherein the angular position is relative to the absolute zero position.

19. The method of claim 17 wherein the signal delay is estimated using Fourier Transforms.

* * * * *